3,271,623
DISCHARGE GAP WITH SPACING VARIED
DIRECTLY WITH SUPPLY VOLTAGE
Tom L. Dyer, Jr., Norman K. Osmundsen, and John B. Brittain, Bloomington, and Robert T. Innis, Ellettsville, Ind., and Daniel L. Whitehead, Export, Pa., assignors to Westinghouse Electric Corporation, East Pittsburgh, Pa., a corporation of Pennsylvania
Filed Aug. 31, 1962, Ser. No. 220,676
6 Claims. (Cl. 315—357)

The present invention relates to a protective discharge gap, and more particularly to a protective discharge gap device in which the gap spacing is automatically adjusted in response to variations in the voltage across the gap.

Discharge gaps are sometimes used as protective devices where it is necessary to very quickly bypass large amounts of energy, as in systems using stored energy power supplies. In such systems, and other systems where large amounts of energy are involved, it is often necessary to bypass the load very quickly in case of a fault in order to protect the load or other equipment. Discharge gaps are very suitable for this purpose and may be provided with trigger electrodes to trigger the discharge in response to a predetermined increase in load current or a predetermined rate of change of load current, or other indication of a fault, so that the gap acts as a substantially instantaneous switch which is capable of carrying very high currents. Thus, the load can be bypassed very rapidly to prevent damage due to a fault or an incipient fault. A discharge gap device of this type is shown, for example, in a co-pending application of H. E. Spindle, Serial No. 145,403, filed May 17, 1961, now Patent No. 3,206,644, and the present invention is particularly suitable for use with such a gap device, although it will be understood that it may be used with any type of gap device.

In some types of systems in which discharge gaps are used, such as systems in which high voltage electron tubes are operated from a direct current power source of the stored energy or similar type, the voltage of the power supply may vary over a relatively wide range during normal operation. Since the gap device is connected directly across the power supply, in parallel with the load, it will be apparent that the gap spacing must be changed when the supply voltage changes. That is, the correct gap spacing when the supply voltage is in the lower part of its range will be too small when the supply voltage rises, while the correct gap spacing when the voltage is high will be too great when the voltage is low. It is necessary therefore to change the gap spacing when the supply voltage changes. In many cases, the supply voltage may vary quite rapidly over a very wide range, and in order to provide reliable and constantly available protection at all times, the gap spacing must change with the instantaneous changes of the supply voltage. The correct gap spacing at any voltage is also determined by the altitude at which the gap device is to operate, since the sparkover voltage at any gap spacing is a function of the air density. The correct setting of the gap may also be influenced by other ambient conditions such as humidity. It is desirable therefore for the gap spacing to be readily adjustable for different altitudes or other ambient conditions. This adjustment, however, need not be automatic but can be made by calibrating the gap for the particular conditions under which it is to operate.

The principal object of the present invention is to provide a discharge gap device adapted for connection across a variable voltage source in which the gap spacing is automatically varied in response to variation of the voltage applied across the gap.

Another object of the invention is to provide a discharge gap device having relatively movable electrodes with means for moving at least one of the electrodes to automatically and continuously adjust the gap spacing in response to changes in the voltage applied across the gap.

A further object of the invention is to provide a discharge gap device in which at least one electrode is movable relative to the other to change the gap spacing, and which has means for rapidly moving the movable electrode to continuously change the gap setting in accordance with changes in the voltage applied across the gap, and which also has means for providing a signal or other indication upon failure of the gap spacing to change when the applied voltage changes.

A still further object of the invention is to provide a discharge gap device in which the gap spacing is automatically and continuously varied in accordance with changes in the voltage applied across the gap, and in which calibrating means are provided for adjusting the gap setting for proper operation at different altitudes, or under other ambient conditions which affect the discharge characteristics.

More specifically, a discharge device is provided for connection across a variable voltage power supply to protect a load. One electrode of the gap device is movable relative to the other to change the gap spacing, and a control system is provided in which a voltage proportional to the supply voltage is balanced against a signal voltage indicating the position of the movable electrode, so that any change in the applied voltage causes a net unbalance voltage which is utilized to effect operation of a drive motor to move the movable electrode until balance is restored. Thus, the gap spacing is automatically adjusted as the applied voltage changes to maintain a desired relation between the voltage and the gap spacing. The system also includes means for providing an alarm or signal in case of failure of the electrode to move, and calibrating means for adjusting the gap setting for operation at different altitudes.

The invention will be more fully understood from the following detailed description, taken in connection with the accompanying drawings, in which.

Figure 1:
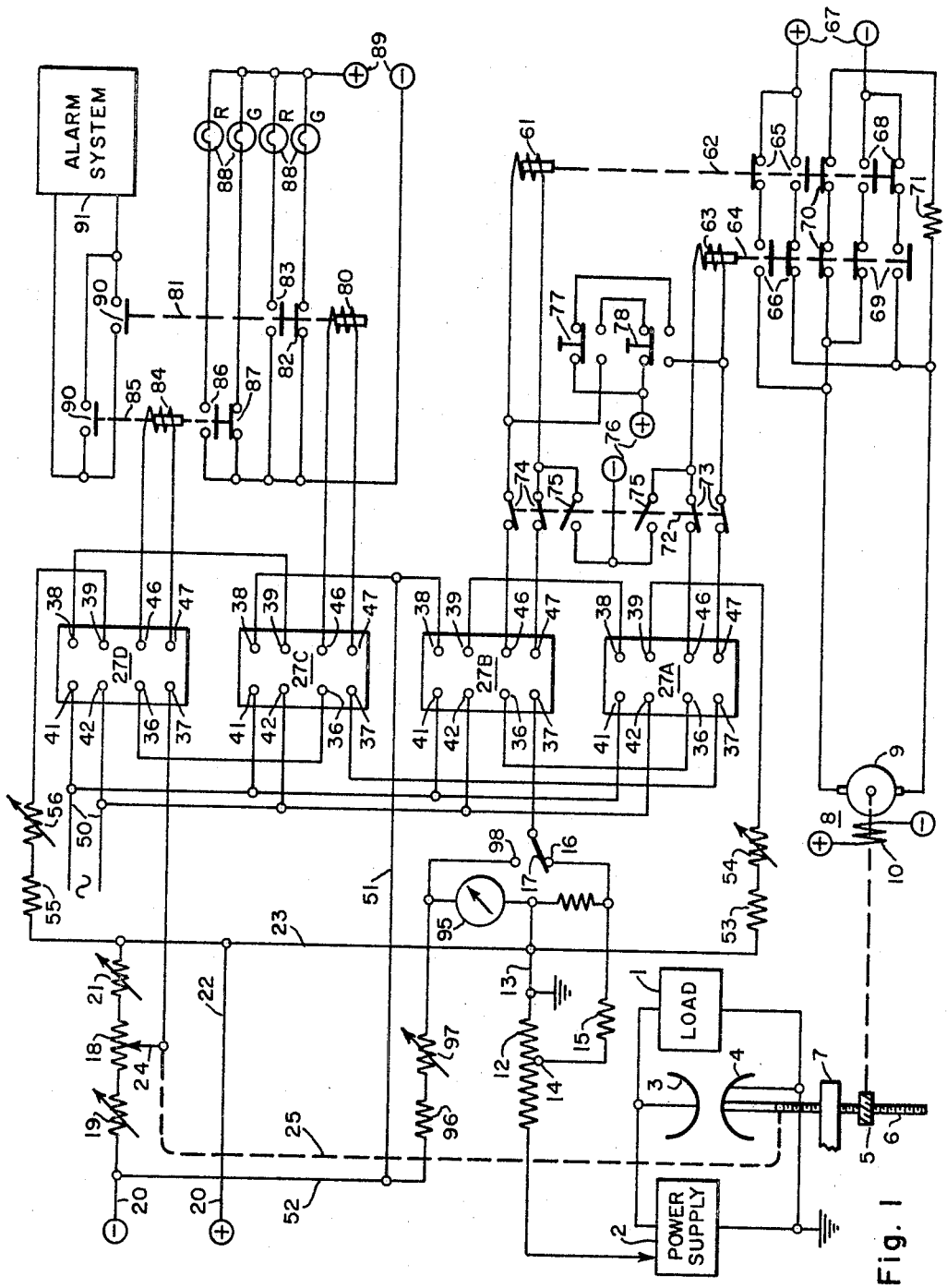
FIGURE 1 is a schematic diagram showing an illustrative embodiment of the invention.

The control system of the present invention is shown in FIG. 1 applied to a discharge gap device for the protection of a load 1 supplied from a power supply 2. The gap device consists of a stationary upper electrode 3 and a movable lower electrode 4 which are connected across the load and the power supply to protect the load in case of a fault. It will be seen that when the gap discharges between the electrodes 3 and 4, the load is bypassed and the gap, in effect, acts as an instantaneously operating switch to bypass and protect the load. The discharge gap device is preferably of the type disclosed in the above-mentioned Spindle application, with a trigger electrode for starting the discharge, although other types of gaps may be used. The detailed construction of the gap and the means by which it is caused to discharge have not been shown since they are not a part of the present invention.

In many systems of this general type, the voltage of the power supply varies over a relatively wide range. Thus, in one particular embodiment of the invention, where the load consists of a number of high voltage electronic power tubes in parallel, the power supply is of the stored energy type and during normal operation its voltage may vary from 37 kilovolts to 300 kilovolts. Obviously, with a power supply of this type, no fixed gap spacing can be correct over the entire voltage range, and to obtain the desired instantaneous protection in case of a fault, the gap spacing must be changed as the voltage varies. Since the voltage changes may be quite rapid, the movement of the lower electrode 4 to change the gap setting must be equally rapid to maintain the correct gap setting at all times. A control system for the movable electrode 4 is provided by the present invention which is capable of tracking the changes in voltage of the power supply and moving the lower electrode in the desired manner to continuously adjust the gap spacing as required.

The lower electrode 4 may be moved vertically to change its position relative to the upper electrode 3 by any suitable means. As shown somewhat diagrammatically for the purpose of illustration, the electrode 4 may be moved by a worm drive indicated at 5 which rotates a nut on a lead screw 6 to move the electrode 4 up or down in its support 7 in accordance with the direction of rotation of the worm drive 5. The worm is driven by a direct current electric motor 8 having an armature 9 and a field winding 10 which is shown as being separately excited. The motor 8 is reversible by reversing its armature connections, as described hereinafter, and thus drives the lower electrode 4 either up or down to close or open the gap. The worm drive shown is only illustrative as the lower electrode may be driven by the motor 8 in any other suitable manner such as by a cam rotated by the motor, which could be used to obtain a non-linear relation between the voltage and the gap spacing.

Operation of the motor 8 is controlled by comparing a signal voltage proportional to the power supply voltage with a signal voltage representative of the position of the electrode 4. For this purpose, there is provided a sensing resistor 12 which has one end connected to the power supply 1 and the other end to ground at 13. The resistor 12 is preferably connected adjustably to the power supply and a predetermined part of the supply voltage is thus applied across the resistor 12. A tap 14 in the resistor 12 is connected through a dropping resistor 15 to a contact 16 of a manual switch 17. The voltage to ground at the tap 14 is proportional to the voltage of the power supply, and a relatively low signal voltage is thus applied to the contact 16 which is proportional to the voltage of the power supply 1.

In order to obtain a voltage representing the position of the electrode 4, a control rheostat 18 is provided. One end of the rheostat 18 is connected through an adjustable resistor 19 to one side of a constant, low voltage, direct current source 20, and the other end is connected through an adjustable resistor 21 and conductor 22 to the other side of the direct current source 20, and through a conductor 23 to ground 13. The movable contact 24 of the control rheostat 18 is mechanically connected to the movable electrode 4, as indicated by the dotted connection 25. This may be any suitable type of mechanical connection between the movable contact 24 and the electrode 4, or the drive means for the electrode, which will cause the arm 24 to move proportionally to the movement of the electrode 4 in either direction. It will be seen, therefore, that the voltage between the movable contact 24 and ground varies with movement of the electrode 4 and is representative of the position of the electrode.

Movement of the electrode 4 is controlled by comparing the two voltages representing the supply voltage and the position of the electrode 4, respectively. The arrangement is such that when the gap spacing is correct, the signal voltage representing the electrode position balances the signal voltage representing the supply voltage and the electrode is stationary. If the supply voltage changes in either direction, a net unbalance occurs and the control operates to move the electrode until the two voltages again balance.

Figure 2:
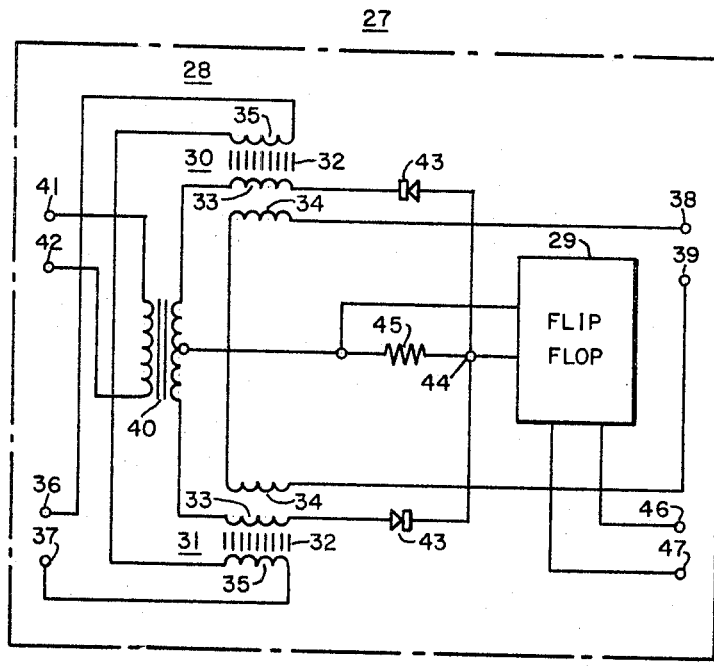
FIG. 2 is a diagram showing a particular type of control device suitable for use in the system of FIG. 1.

Any suitable type of control devices may be used to compare the two voltages and control the electrode movement, but it is preferred to use bistable amplifiers 27 of the type shown in FIG. 2. These devices operate in response to an input current of one polarity to provide a direct current output. In the absence of an input current, or if the input current is reversed in polarity, no output occurs. The device is therefore bistable, having two output states, and is either ON or OFF depending on the polarity and magnitude of the input current. The bistable amplifier therefore is similar in its operation to a sensitive polarized relay but has the high sensitivity and extremely rapid operation which is necessary for the purposes of the present control system. It should be understood, however, that any device having similar characteristics might be utilized.

The bistable amplifier of FIG. 2 is of the type more fully disclosed and claimed in a copending application of R. W. Roberts et al., Serial No. 782,017, filed December 22, 1958. As more fully described in that application, this device includes a pulse type control stage 28 and a bistable output stage or flip-flop 29. The control stage 28 includes two similar self-saturating magnetic amplifiers 30 and 31. Each of the magnetic amplifiers 30 and 31 has a saturable magnetic core 32 which has a load winding 33, a bias winding 34, and a control winding 35 thereon. The control windings 35 are connected in series, in opposition to each other, and to input terminals 36 and 37. The bias windings 34 are also connected to each other in series and to terminals 38 and 39. A supply transformer 40 has its primary winding connected to terminals 41 and 42 and has a center-tapped secondary winding. The load windings 33 are connected to the ends of the secondary winding of transformer 40 and through oppositely poled rectifiers 43 to a terminal 44. One end of a load resistor 45 is connected to the terminal 44 and its other end is connected to the center tap of the secondary winding of transformer 40.

The bias windings 34 are provided with a suitable bias current through the terminals 38 and 39 such that in the absence of current in the control windings 35 the amplifiers 30 and 31 fire simultaneously on each half-cycle of an alternating current voltage applied to the terminals 40 and 41. Since the windings 35 oppose each other, no voltage appears across the output resistor 45. When a control current flows in the windings 35, since the control windings 35 are in opposition, the firing point of one amplifier will be advanced and that of the other will be retarded by an equal amount. Thus, a pulse of output current will appear across the resistor 45, and the polarity of the voltage pulse is determined by the polarity of the control current in the control windings 35.

The output stage 29 of the bistable amplifier 27 may be any suitable bistable circuit or flip-flop comprising static components such as transistors, and preferably including a power stage or amplifier to give a desired level of output voltage. The flip-flop 29 is connected across the resistor 45, so that when a voltage pulse of proper polarity appears across the resistor, the flip-flop is caused to switch to its ON state in which an output voltage appears at the terminals 46 and 47. When the flip-flop is thus turned on it will remain in that state until a voltage of opposite polarity occurs across the resistor 45 which causes the flip-flop to switch to its OFF state and the output voltage at terminals 46 and 47 disappears.

It will be seen that the bistable amplifier 27 is an ON-OFF device and its operation is similar to that of a polarized relay. When an alternating current supply voltage is applied to the terminals 41 and 42, and a bias current is supplied to the windings 34, a control current of one polarity, and of magnitude determined by the bias current, flowing in the control windings 35 causes a voltage to appear at the terminals 46 and 47 which continues until the control current is reversed. Since this device consists of static components, it is highly reliable and has an extremely rapid response. While this bistable amplifier is the preferred type of control device for use in the present control system, it is to be understood that any other control device having similar characteristics might be utilized.

Returning now to FIG. 1, four bistable amplifiers 27A, 27B, 27C and 27D are utilized, each having terminals identified by the same reference numerals as the corresponding terminals of FIG. 2. A source of alternating current supply voltage indicated at 50 is connected to the terminals 41 and 42 of all four bistable amplifiers. The amplifiers 27A and 27B are used to control the operation of the motor 8, and the amplifiers 27C and 27D are used to control an alarm and signal system. Separate biasing circuits are therefore provided for the two sets of bistable amplifiers. The bias terminal 38 of the amplifier 27A is connected to the terminal 39 of amplifier 27B to connect the bias windings of the two amplifiers in series with the same polarity. The terminal 38 of amplifier 27B is connected through conductors 51 and 52 to the negative side of the direct current source 20. The terminal 39 of amplifier 27A is connected through a fixed resistor 53, an adjustable resistor 54 and conductor 23 to the positive side of the direct current supply 20. The magnitude of the bias current in the amplifiers 27A and 27B can be adjusted by means of the resistor 54 to obtain the desired sensitivity by setting the operating point of the amplifiers 27A and 27B, that is, the minimum control current necessary for operation.

The terminal 39 of the amplifier 27C is connected to terminal 38 of the amplifier 27D to connect the bias windings of these two amplifiers in series with the same polarity, and terminal 38 of amplifier 27C is connected through conductor 51 to the negative side of the direct current supply. The terminal 39 of amplifier 27D is connected through a fixed resistor 55 and adjustable resistor 56 to conductor 22 and the positive side of the direct current supply 20. The bias current of the amplifiers 27C and 27D can be adjusted by the variable resistor 56 and is set so that the operating point of the amplifiers 27C and 27D is somewhat higher than that of the amplifiers 27A and 27B.

As previously described, the voltage derived from the sensing resistor 12 is applied to contact 16 of a manual switch 17. The switch 17 is connected to the control winding terminal 37 of amplifier 27B and the control winding terminals 36 and 37 of all four bistable amplifiers are connected together as shown so that all the control windings are connected in series. The terminal 37 of amplifier 27D is connected to the movable contact 24 of the control rheostat 18. The connections between the control windings of the four bistable amplifiers are made so that the polarities of amplifiers 27A and 27C are opposite to those of amplifiers 27B and 27D, that is, the connections are made so that amplifiers 27A and 27C will respond to a current of one polarity while amplifiers 27B and 27D will respond to a current of opposite polarity. It will be seen that since the contact arm 24 of rheostat 18 is connected to the tap 14 of resistor 12 through the four control windings in series, the voltage representing the position of electrode 4 is balanced against the voltage representing the power supply voltage, and when these two voltages are equal no current flows in the control windings 35 of any of the bistable amplifiers and no outputs occur from any of them.

The bistable amplifiers 27A and 27B are used to control the motor 8. For this purpose, the output terminals 46 and 47 of amplifier 27B are connected to the operating coil 61 of a relay 62, and the output terminals of amplifier 27A are connected to the operating coil 63 of a relay 64. The relays 62 and 64 have corresponding sets of contacts 65 and 66, respectively, which are connected between the motor 8 and one side of a direct current source 67. The relays 62 and 64 also have corresponding sets of contacts 68 and 69 connected between the motor 8 and the other side of the source 67. The corresponding sets of relay contacts are connected as shown in FIG. 1 so that they function as a reversing switch to reverse the connection of the motor 8 to the source 67. The relays are also provided with normally closed contacts 70 which are connected in series with a braking resistor 71 across the motor. It will be seen that when relay 62 is energized, the motor is connected to the source 67 for rotation in one direction, and when the relay 64 is energized the motor is connected for rotation in the opposite direction, while if both relays are deenergized the contacts 70 connect the braking resistor 71 across the motor to bring it to a rapid stop.

Provision is also made for manual control of the movable electrode 4. For this purpose, a manual switch 72 is provided which has contacts 73 and 74 connected in series with the output terminals of the amplifiers 27A and 27B, respectively, and contacts 75 which are open when the contacts 73 and 74 are closed. The contacts 75 are connected to one side of a direct current source 76 and to the relay coils 61 and 63, respectively. Two double-throw push-buttons 77 and 78 are also provided. These push buttons are connected, as shown, between the other ends of the respective relay coils 61 and 63 and the other side of the direct current source 76.

When the switch 72 is in the position shown in the drawing, for automatic operation, the push buttons 77 and 78 are inoperative. If it is desired to operate the movable electrode 4 manually, the switch 72 is moved to its other position in which the contacts 73 and 74 are open and the contacts 75 closed. If it is then desired to move the electrode in one direction, the push button 77 is actuated to its lower position. One side of the source 76 is then connected through the push button 78 and the lower contacts of the push button 77 to the relay coil 61 while the other end of the coil 61 is connected through the switch contact 75 to the other side of the supply 76. The relay 62 is thus energized to cause operation of the motor 8 which continues until the push button 77 is returned to the position shown in the drawing to interrupt the circuit to the coil 61. If it is desired to move the electrode in the other direction, the push button 78 is moved to its lower position and one side of the source 76 is then connected through the upper contacts of push button 77 and lower contacts of push button 78 to the relay coil 63, the other end of which is connected to the source through switch contact 75. The relay 64 is thus energized to cause rotation of the motor 8 in the opposite direction until the push button 78 is returned to the position shown in the drawing.

The bistable amplifiers 27C and 27D are used to actuate alarm and indicating means in case of failure of the electrode 4 to move in the intended manner. For this purpose, the output terminals 46 and 47 of amplifier 27C are connected to the operating coil 80 of a relay 81 which has a normally closed contact 82 and a normally open contact 83. Similarly, the output terminals 46 and 47 of amplifier 27D are connected to the operating coil 84 of a relay 85 which has a normally open contact 86 and a normally closed contact 87. The contacts 82, 83, 86 and 87 are individually connected in series with indicating lamps 88 across a direct current source 89, the lamps connected to the contacts 87 and 82 normally being lighted. The lamps may be of different colors, as indicated by the letters R and G representing red and green, and under normal conditions the green lamps are lighted, while if either of the relays 81 or 85 is energized, the corresponding red lamp is lighted and the green lamp goes out. Each of the relays may also have a normally open contact 90, and the contacts 90 are connected in parallel to an alarm system 91 which may be any suitable type of alarm or annunciator system, either audible or visual, and which may be located at any suitable remote point to give an alarm or indication upon operation of either of the relays 81 or 85.

The operation of this system should now be apparent. As previously described, the voltage derived from the sensing resistor 12 is proportional to the power supply voltage, and the voltage at contact arm 24 represents the position of the movable electrode 4. These two voltages are balanced against each other through the control windings of the four bistable amplifiers 27. When these two voltage balance, no current flows in the control windings and no output occurs at the output terminals of any of the amplifiers. If the power supply voltage varies, however, the two voltages become unequal and a current due to the net unbalance flows through the control windings of the amplifiers, the direction of the current depending on whether the supply voltage has increased or decreased. Thus, either the amplifier 27A or the amplifier 27B will have an output voltage at its terminals 46 and 47, depending on the direction of current flow. The output from amplifiers 27A or 27B energizes the corresponding relay 62 or 64 to cause operation of the motor 8 to move the electrode 4 to either increase or decrease the gap spacing depending on the direction in which the supply voltage has changed. The movement of the electrode is in the direction to reduce the difference between the signal voltages representing the supply voltage and the position of the electrode, respectively, and when this difference is reduced to zero, the electrode is correctly positioned for the new supply voltage. As the control current passes through zero, the output of the bistable amplifier is switched off and the corresponding relay is deenergized and drops out. The motor 8 is thus deenergized and the braking resistor 71 is connected across it to quickly stop the motor and accurately position the electrode.

The bias currents of the amplifiers 27C and 27D are set so that in normal operation the control current does not reach the operating points of these two amplifiers. If for any reason, however, the electrode 4 fails to move, or any improper operation occurs, the control current will increase sufficiently to turn on one or the other of the amplifiers 27C and 27D, depending on the direction of the current. This causes an output to appear at the terminals 46 and 47 of one or the other of the amplifiers and energizes either the relay 81 or the relay 85. The corresponding warning lights 88 will be actuated as described above, and the alarm system 91 will be energized to give a visual or audible indication of the failure of the system to operate properly, thus warning the operator to take appropriate action.

Figure 3:
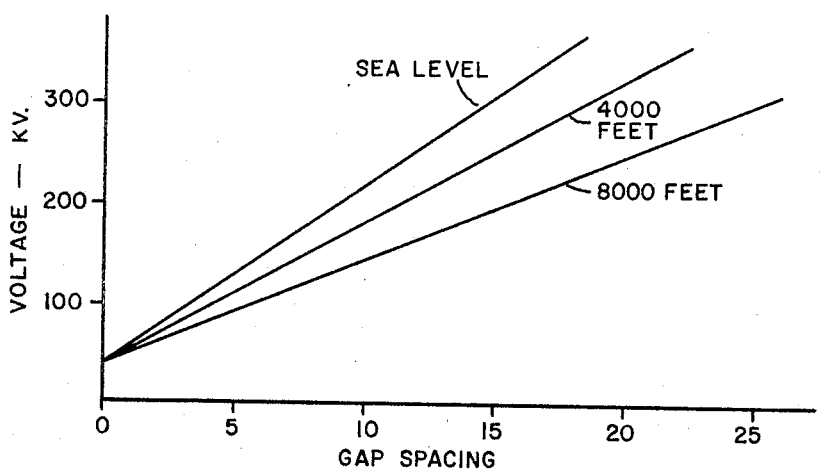
FIG. 3 is a set of curves showing the relation between voltage and gap spacing at different altitudes.

The spacing of the discharge gap between electrodes 3 and 4 is thus continuously and automatically adjusted in accordance with changes in the power supply voltage applied across the gap, and the gap spacing is always kept at the correct value for the instantaneous value of the supply voltage. The correct gap spacing for any given voltage, however, depends on the altitude at which the gap is to be operated since the voltage at which the gap arcs over is a function of the air density in the gap. This is illustrated by the curves of FIG. 3 which show the relation between voltage and correct gap spacing in centimeters above a fixed minimum spacing, for one particular embodiment of the invention, at sea level and at two higher altitudes. The relation is seen to be substantially linear but the slopes of the curves differ for different altitudes. The gap must therefore be calibrated for the altitude at which it is to be operated, and this calibration can be made by adjusting the slope of the curve which can readily be done by setting the gap to the correct spacing at two points, preferably the points of minimum and maximum voltage to be applied to the gap.

The calibration for altitude is effected by means of the variable resistors 19 and 21 in combination with a voltmeter 95. The voltmeter 95 is connected to the grounded positive side of the direct current supply 20 through conductor 23, and to the negative side of the direct current supply through a resistor 96, an adjustable calibrating resistor 97 and conductor 52. The calibrating resistor 97 is also connected to a contact 98 of the manual switch 17.

To calibrate the gap, the switch 17 is initially placed on the contact 16. The calibrating resistor 97 is then adjusted until the voltmeter 95 indicates a voltage corresponding to the minimum voltage to be applied by the power supply 2, that is, a voltage equal to that which appears at the contact 16 at this value of applied voltage. The gap electrode 4 is then moved manually, in the manner previously described, until the gap spacing is reduced to somewhere near its minimum. The switch 17 is then placed on the contact 98 with the switch 72 in position for automatic operation. Since the calibrating voltage which is now balanced against the voltage at the contact arm 24 corresponds to the minimum applied voltage, the electrode 4 will move in a direction to close the gap to its minimum spacing. When the electrode 4 stops, the spacing of the gap is measured and compared with the correct value of gap spacing for the minimum voltage at the desired altitude, as determined from a calibration curve similar to the curves of FIG. 3. If the gap spacing is not correct, the resistor 21 is adjusted to effect movement of the gap electrode 4 in the proper direction. Adjustment of the resistor 21 changes the distribution of voltage across the control rheostat 18 and resistor 21 and thus changes the voltage at contact arm 24, which results in movement of the gap electrode in one direction or the other. By this means, the electrode 4 is readily brought to the proper position for the correct gap spacing.

A similar procedure is followed to set the gap for the maximum applied voltage. With switch 17 on the contact 16, the calibrating resistor 97 is adjusted until the reading of the voltmeter 95 corresponds to the maximum voltage of the power supply. The electrode 4 is then moved in the direction to open the gap by manual operation until the gap is near its maximum spacing and the switch 17 is then placed on contact 98 which will result in some further movement of electrode 4. The gap spacing is checked and if not correct, as determined from the calibration curve, the resistor 19 is adjusted to bring the electrode 4 to the correct position. Adjustment of resistor 19 changes the voltage at the contact arm 24 and thus causes movement of the electrode as previously explained. The calibration for both maximum and minimum voltage should preferably be repeated two or three times, since each adjustment affects the other, to some extent, and two or three adjustments are usually required to obtain the correct setting at both maximum and minimum supply voltages. In this way, the gap is easily calibrated for different altitudes, or other ambient conditions, by setting the correct gap spacing at two points to determine the slope of the curve of voltage against gap spacing.

It will now be apparent that a discharge gap control system has been provided for use with a protective gap device for variable supply voltage, in which the spacing of the gap is automatically and continuously varied as the applied voltage varies, to maintain the correct gap spacing at any instantaneous value of the applied voltage. The system is highly reliable and very rapid in operation and permits calibration of the gap for operation at different altitudes. Since the system operates by balancing two opposing voltages, it is a null balance type of system and is very sensitive while requiring a minimum of power for operation.

A preferred embodiment of the invention has been shown and described for the purpose of illustration but it is to be understood that various modifications and other embodiments are possible. Thus, the particular bistable amplifier control devices described are preferred because of their reliability and rapid response but other control devices having similar characteristics might equally well be used. Various other modifications may also be made and all such embodiments and modifications are within the scope of the invention.

We claim as our invention:

1. A discharge gap device for protecting a load device connected to a variable voltage source, the magnitude of which varies over a wide range of voltages under normal operating conditions, said gap device including a pair of electrodes spaced apart to form a discharge gap between them and connected across said load device, one of said electrodes being movable with respect to the other electrode, a reversible electric motor adapted to drive the movable electrode in either direction to vary the spacing of the gap, means for obtaining a signal voltage proportional to the voltage magnitude of the source, means for obtaining a signal voltage representative of the position of the movable electrode, means for balancing said signal voltages against each other, and a pair of control devices responsive to unbalance of the signal voltages of predetermined magnitude and of respectively opposite directions for effecting operation of said motor to move the movable electrode to maintain a predetermined relation between the gap spacing and the voltage of the source.

2. A discharge gap device for protecting a load device connected to a variable voltage source, the magnitude of which varies over a wide range of voltages under normal operating conditions, said gap device including a pair of electrodes spaced apart to form a discharge gap between them and connected across said load device, one of said electrodes being movable with respect to the other electrode, a reversible electric motor adapted to drive the movable electrode in either direction to vary the spacing of the gap, means for obtaining a signal voltage proportional to the voltage magnitude of the source, means for obtaining a signal voltage representative of the position of the movable electrode, means for balancing said signal voltages against each other, a first pair of control devices responsive to unbalance of the signal voltages of predetermined magnitude and of respectively opposite directions for effecting operation of said motor to move the movable electrode to maintain a predetermined relation between the gap spacing and the voltage of the source, and a second pair of control devices responsive to unbalance of the signal voltages of magnitude greater than said predetermined magnitude and of respectively opposite directions for providing a signal if the movable electrode fails to move.

3. A discharge gap device protecting a load connected to a source of supply voltage, the magnitude of which varies over a wide range of voltages under normal operating conditions, said gap device including a pair of electrodes forming a discharge gap connected across the load device, means for sensing changes in the voltage magnitude of said source and producing a signal in response thereto, means for moving at least one of said electrodes to change the spacing of the gap in response to said signal, the movement of said electrode maintaining a predetermined relation between the gap spacing and the magnitude of the supply voltage.

4. The combination of claim 3 in which a signal means is provided for indicating the failure of the movable electrode to move when the magnitude of the voltage changes.

5. The combination of claim 3 including means for effecting movement of the movable electrode at any voltage level of the supply source to adjust the spacing of the gap independently of the means for maintaining the predetermined relation.

6. A discharge gap device protecting a load connected to a source of supply voltage, the voltage level of which varies over a wide range under normal operating conditions, said gap device including a pair of electrodes forming a discharge gap connected across the load device, at least one of said electrodes being movable to vary the spacing of the gap, means for obtaining a signal voltage proportional to the voltage level of said source, means for obtaining a signal voltage representative of the position of said movable electrode, and means responsive to the difference of said voltages for moving said movable electrode, said movable electrode maintaining a predetermined relationship between the gap spacing and the voltage level of the supply source.

References Cited by the Examiner

UNITED STATES PATENTS

| | | | |
|---|---|---|---|
| 1,197,485 | 9/1916 | Heinritz | 317—75 |
| 1,953,454 | 4/1934 | Wollaeger | 315—357 |
| 2,314,007 | 3/1943 | Matheson | 315—357 |
| 2,339,861 | 1/1944 | Keeler | 315—357 |
| 2,408,004 | 9/1946 | Slack | 313—252 X |
| 2,427,460 | 9/1946 | Johnson | 313—146 X |
| 2,492,669 | 12/1949 | Taylor | 313—152 X |
| 2,525,938 | 10/1949 | Peck | 313—146 X |
| 2,866,119 | 12/1958 | Jennings | 313—220 X |
| 2,939,065 | 5/1960 | Matulaitis | 315—227.1 |
| 2,979,639 | 8/1961 | Williams et al. | 315—227.1 |

JAMES W. LAWRENCE, *Primary Examiner.*

GEORGE N. WESTBY, C. R. CAMPBELL, S. D. SCHLOSSER, R. SEGAL, *Assistant Examiners.*